United States Patent
Isshiki et al.

(10) Patent No.: US 9,621,533 B2
(45) Date of Patent: Apr. 11, 2017

(54) BIT STRING COLLATION SYSTEM, BIT STRING COLLATION METHOD, AND PROGRAM

(71) Applicant: NEC Corporation, Tokyo (JP)

(72) Inventors: Toshiyuki Isshiki, Tokyo (JP); Toshinori Araki, Tokyo (JP); Kengo Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/652,082

(22) PCT Filed: Dec. 13, 2013

(86) PCT No.: PCT/JP2013/083475
§ 371 (c)(1),
(2) Date: Jun. 12, 2015

(87) PCT Pub. No.: WO2014/092183
PCT Pub. Date: Jun. 19, 2014

(65) Prior Publication Data
US 2015/0334100 A1    Nov. 19, 2015

(30) Foreign Application Priority Data
Dec. 14, 2012    (JP) .................................. 2012-273450

(51) Int. Cl.
*H04L 29/00* (2006.01)
*H04L 29/06* (2006.01)
(Continued)

(52) U.S. Cl.
CPC .............. *H04L 63/08* (2013.01); *G06F 21/32* (2013.01); *H04L 9/065* (2013.01); *H04L 9/0866* (2013.01); *H04L 9/3231* (2013.01); *H04L 63/20* (2013.01)

(58) Field of Classification Search
CPC . H04L 9/086; H04L 9/32; H04L 63/08; G06F 21/03
(Continued)

(56) References Cited

U.S. PATENT DOCUMENTS 6,038,315 A * 3/2000 Strait .................... H04L 9/0662
382/115
7,200,549 B1    4/2007 Fujii et al.
(Continued)

FOREIGN PATENT DOCUMENTS

JP    2007-500910 A    1/2007
JP    2010-108365 A    5/2010
(Continued)

OTHER PUBLICATIONS

Ignatenko, Tanya, and Frans Willems. "On the security of the XOR-method in biometric authentication systems." The twenty-seventh symposium on Information Theory in the Benelux. 2006.*
(Continued)

*Primary Examiner* — Madhuri Herzog
(74) *Attorney, Agent, or Firm* — Wilmer Cutler Pickering Hale and Dorr LLP (57) ABSTRACT

A system includes a first bit string position permutation unit to perform position permutation of an input first bit string; a template generation unit to perform an exclusive OR operation of a bit string resulting from the position permutation of the first bit string and a code word of a binary linear code and generate auxiliary data; a second bit string position permutation unit to perform same position permutation of an input second bit string; and a bit string collation unit to verify that a hamming distance between position permutation result of the second and second bit strings is not more than a predetermined value.

16 Claims, 7 Drawing Sheets

(51) Int. Cl.
*H04L 9/06* (2006.01)
*H04L 9/32* (2006.01)
*G06F 21/32* (2013.01)
*H04L 9/08* (2006.01)

(58) Field of Classification Search
USPC .............................. 726/1–18; 713/168–186
See application file for complete search history.

(56) References Cited

U.S. PATENT DOCUMENTS

| | | | |
|---|---|---|---|
| 8,032,760 | B2 | 10/2011 | Tuyls et al. |
| 8,412,940 | B2 | 4/2013 | Takahashi et al. |
| 8,412,950 | B2 | 4/2013 | Kevenaar et al. |
| 8,833,810 | B2 | 9/2014 | Koizumi et al. |
| 2005/0229009 | A1 | 10/2005 | Fujii et al. |
| 2007/0044139 | A1 | 2/2007 | Tuyls et al. |
| 2008/0222496 | A1 | 9/2008 | Tuyls et al. |
| 2010/0014655 | A1* | 1/2010 | Chmora ............... G06F 21/32 380/28 |
| 2010/0162072 | A1* | 6/2010 | Chabanne ........... G07C 9/00158 714/752 |
| 2010/0306550 | A1 | 12/2010 | Kevenaar et al. |
| 2011/0185176 | A1* | 7/2011 | Takahashi ............ G06F 21/32 713/168 |
| 2011/0233945 | A1 | 9/2011 | Koizumi et al. |

FOREIGN PATENT DOCUMENTS

| | | |
|---|---|---|
| JP | 2011-523725 A | 8/2011 |
| WO | WO-2004/104899 A2 | 12/2004 |
| WO | WO-2009/081338 A2 | 7/2009 |
| WO | WO-2014/010725 A1 | 1/2014 |

OTHER PUBLICATIONS

International Search Report corresponding to PCT/JP2013/083475 mailed Feb. 18, 2014 (2 pages).
Pim Tuyls et al., Practical Biometric Authentication with Templete Protection, AVBPA 2005, LNCS 3546, 2005, p. 436-446 (11 pages).
Kenta Takahashi, "A Protocol for Secure Remote Authentication Using Biometrics", IPSJ Journal, vol. 49, No. 9 [CD-ROM], Sep. 15, 2008, pp. 3016 to 3027 (14 pages).
Haruki Ota, "Proposal of an Iris Identification Scheme Hiding Iris Codes", Transactions of Information Processing Society of Japan, vol. 45, No. 8, Aug. 15, 2004, pp. 1845 to 1855 (13 pages).
Atallah, M. J., et al., "Secure Biometric Authentication for Weak Computational Devices," Finanical Cryptography and Data Security, 9th International Conference, pp. 357-371, XP019011820 (Feb. 28-Mar. 3, 2005).
Extended European Search Report issued by the European Patent Office for Application No. 13861755.0 dated Jul. 6, 2016 (11 pages).

* cited by examiner

BIT STRING COLLATION SYSTEM, BIT STRING COLLATION METHOD, AND PROGRAM

TECHNICAL FIELD

Description of Related Application

This application is a national stage application of International Application No. PCT/JP2013/083475 entitled "BIT STRING COLLATION SYSTEM, BIT STRING COLLATION METHOD, AND PROGRAM" filed on Dec. 13, 2013, which claims the benefit of the priority of Japanese Patent Application No. 2012-273450, filed on Dec. 14, 2012, the disclosures of each of which are hereby incorporated by reference in their entirety.

The present invention relates to a bit string collation system, a bit string collation method, and a program.

BACKGROUND

There has been known a service based on user data provided on a computing resource connected to a network. There is an opportunity for handling sensitive data of a user in such a service. In handling sensitive user data, it is important for a service provider to guarantee that data related to a user is securely managed. On the other hand, authentication using a password or an object may fail even for a person in question due to oblivion or a loss of the password or the object. As a method to avoid occurrence of such a situation, there is provided a technology referred to as a biometric authentication technology based on a personal biometric feature (referred to as biometric information) such as a fingerprint or a vein. Since biometric information remains unchanged through life, which is different from a password or object, leakage of biometric information may cause immense damage.

In biometric authentication, information that is generated based on biometric information and referred to as a template is stored in a database or the like, and the authentication is performed using the template. As described above, high confidentiality is required for biometric information. Thus, it is preferable to use an authentication method in which information related to biometric information does not leak from a template as well, as much as possible, and various methods have been hitherto proposed.

Figure 7:
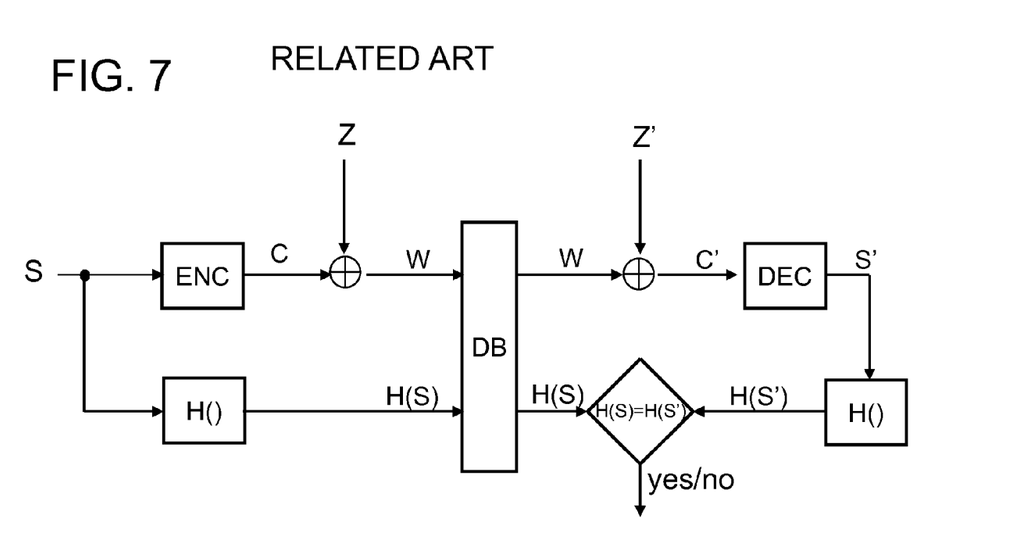
FIG. 7 is a diagram illustrating processing in Non-Patent Literature 1.

Non-Patent Literature 1, for example, discloses a method in which information obtained by masking biometric information by a random BCH (bose-chaudhuri-hocquenghem) code word is set in a template. In Non-Patent Literature 1, the template for biometric authentication is generated using biometric information Z and secret information S. FIG. 7 is a diagram based on FIG. 2 in Non-Patent Literature 1. Feature extraction (Feature Extraction), statistical processing (Statistical Analysis), quantization (Quantization), and so forth in FIG. 2 in Non-Patent Literature 1 are omitted. The method described in Non-Patent Literature 1 includes enrollment (Enrollment) and verification (Verification). Enrollment (Enrollment) of the template related to the biometric information Z is performed as follows:

(1) The secret information S is supplied to an encoder (ENC) to be subject to error correcting coding (Error Correcting Coding: ECC), thereby generating a code word C. Binary BCH code having parameters (K, s, d) is used as ECC, where K denotes the length of code words (cord word), s is the number of information symbols (information symbols), and d is the number of errors that can be corrected.

(2) Exclusive OR of code word C and biometric information Z: W=C(+)Z is computed (where (+) indicates bit-by bit-based XOR (bitwise XOR) operation).

(3) A hash value H(S) is computed, wherein H is a cryptographic hash function (cryptographic hash function) of SHA (Secure Hash Algorithm)-1 or the like.

(4) W and H(S) are stored in a database (DB), as a template.

It is assumed that the above process is executed by an enrollment apparatus (not illustrated), and the template that has been generated is stored in the storage apparatus (DB).

Verification (Verification) of whether or not the template (two sets: W and H(S)) generated by the above-mentioned steps (1) to (4) and different biometric information Z' are extracted from a same person is performed as follows. It is assumed that the verification is executed between two apparatuses that are a certification apparatus (not illustrated) configured to store the biometric information Z' and a verification apparatus (not illustrated) including the template (two sets: W and H(S)). The process of the verification is performed by the following steps (1) to (5).

(1) The certification apparatus supplies the biometric information Z' to the verification apparatus.

(2) The verification apparatus computes an exclusive OR C' of Z' and W: C'=W(+)Z'. It is to be noted herein that W(+)Z'=(C(+)Z)(+)Z'=C(+)(Z(+)Z')=C(+)Z(+)Z'.

(3) The verification apparatus supplies C' to a decoder (DEC). The decoder (DEC) performs error correcting decoding processing of the binary BCH code to compute S'.

(4) The verification apparatus computes a hash value H(S').

(5) The verification apparatus compares H(S') with H(S) read from the DB. When H(S)=H(S') holds, the verification apparatus determines that a hamming distance between the biometric information used for generation of the template and the biometric information Z' is close.

The reason why it can be verified by the above-mentioned steps that a hamming distance between the biometric information Z used for generation of the template and the biometric information Z' used for the verification is not more than a predetermined value will be described below.

In step (2) of the verification process, C(+)Z(+)Z' is computed. C(+)Z(+)Z' can be regarded as data in which an error of Z(+)Z' is added (added by an exclusive OR operation) to the error correcting code word C. That is, C(+)Z(+)Z' is data obtained by giving to the code word C, an error or errors, the number of which corresponds to the hamming distance between the biometric information Z and the biometric information Z'. When the number of the error(s) is not more than d, the code word C can be decoded.

Accordingly, assuming that an error correcting process is executed on C(+)Z(+)Z', when the hamming distance between the biometric information Z and the biometric information Z' is not more than, the secret information S', which is an output of the error correcting process, becomes the secret information S from which the error correcting code word C is generated. It is clear in this case that H(S')=H(S) holds.

On the other hand, even if the error correcting process is executed on C(+)Z(+)Z', when the hamming distance between the biometric information Z and the biometric information Z' is larger than d, a secret information S cannot be obtained as an output S'. In this case, H(S')=H(S) does not hold.

Accordingly, the above-mentioned process makes it possible to determine that hamming distance between biometric information is close.

The above-described approach does not depend on an acquisition method of biometric information Z. For this reason, the above-described approach can be used for determining closeness of a hamming distance for bit string information as well as biometric information. That is, a bit string is enrolled in a storage apparatus using the enrollment apparatus above described, a bit string is inquired by the certification apparatus, and the bit strings are collated by the verification apparatus.

Patent Literature 1, for example, discloses the following arrangement, as an authentication technology using templates.

At an enrollment time, a feature data array for enrollment is generated from biometric information acquired by a client, and a position correction template and a comparison template obtained by converting the feature data array for enrollment are registered in a server. At an authentication time, a feature data array for authentication is generated from biometric information acquired by the client, and converted feature data for position correction obtained by converting the feature data array for authentication is transmitted to the server. The server detects a position correction amount of the feature data array for authentication relative to the feature data array for enrollment using the position correction template and the converted feature data for position correction, and transmits the position correction amount to client. The client corrects the feature data array for authentication using the position correction amount and transmits to the server a converted feature data array for comparison obtained by further converting the corrected feature data array. The server calculates a distance between the comparison template and the converted feature data array for comparison and determines success or failure of the authentication on the basis of the distance.

[Patent Literature 1]
JP Patent Kokai Publication No. JP2010-108365A
[Patent Literature 2]
International Publication No. WO 2014/010725 A1
[Non-Patent Literature 1]
Pim Tuyls, Anton H. M. Akkermans, Tom A. M. Kevenaar, Geert-Jan Schrijen, Asker M. Bazen and Raymond N. J. Veldhuis, "Practical Biometric Authentication with Template Protection", Proceedings of AVBPA 2005, Lecture Notes in Computer Science, Vol. 3546, Springer Verlag, pp. 436-446, (2005)

SUMMARY

The following describes analysis of the related arts.

The above-mentioned related art has the following scheme. Assuming that a code word of the binary BCH code is C, a template for a bit string Z includes C(+)Z(=W) as a template portion. A cyphertext together with auxiliary data are made to be a template.

When the number of errors that can be corrected by the binary BCH code for use is d, it can be determined whether or not a hamming distance between bit strings used for generation of two different templates is not more than d, using cyphertexts of these data.

Herein, chippertexts generated for a bit string $Z1$ and a bit string $Z2$ are considered. $C1(+)Z1$ and $C2(+)Z2$ are generated by code words $C1$ and $C2$ of the binary BCH code that are independent, as cipher texts for these bit strings $Z1$ and $Z2$.

Since the binary BCH code is a linear code, $C1(+)C2$ is also a code word.

$Z1(+)Z2$ is a bit string having one or more is whose number is equal to a hamming distance between the bit strings.

Accordingly, when a hamming distance of $Z1(+)Z2$ is not more than d, $C1(+)C2(+)Z1(+)Z2$ can be decoded by binary BCH code decoding processing.

When the hamming distance of $Z1(+)Z2$ is larger than d, $C1(+)$ $C2(+)Z1(+)Z2$ cannot be decoded.

Accordingly, in the case wherein two cyphertexts are obtained, it can be determined that a hamming distance between bit strings used for generation of those cyphertexts is close. This means that information on the bit strings could be obtained from the cyphertexts.

When the related art is used for biometric authorization, biometric information is used as a bit string. In this case, it is desired that the above-mentioned information leakage of the bit string from a cyphertext and so forth be avoided. By utilizing the information used for encryption, for example, a sophisticated analysis becomes possible by comparing information in which a person who manages a site A is enrolled and information in which a person who manages a site B is enrolled, by identifying that a certain person is enrolled in both of the sites, and by comparing behavior logs or the like in the respective sites. That is, information leakage may occur.

The present invention has been accordingly devised in view of the above-mentioned problem. An object of the present invention is to provide a system, a method, and a program to make it difficult to associate data related to a same bit string enrolled in different systems or the like, for example, in utilizing an exclusive OR of an input bit string and a code word of a binary linear code as a template portion, thereby enabling to avoid information leakage and ensure security.

According to the present invention, there is provided a system (apparatus) comprising:

a first bit string position permutation unit that performs position permutation of an input first bit string;

a template generation unit that performs an exclusive OR operation of a bit string resulting from the position permutation of the first bit string by the first bit string position permutation unit and a code word of a binary linear code, generates auxiliary data for use in verifying that a hamming distance between bit strings resulting from position permutation operations is not more than a predetermined preset value, and stores a result of the exclusive OR operation and the auxiliary data as a template in a storage apparatus;

a second bit string position permutation unit that performs same position permutation of an input second bit string as the position permutation by the first bit string position permutation unit; and a bit string collation unit that verifies that a hamming distance between a bit string resulting from the position permutation of the second bit string by the second bit string position permutation unit and the bit string used for generation of the template and resulting from the position permutation of the first bit string by the first bit string position permutation unit is not more than the predetermined preset value, based on the bit string resulting from the position permutation of the second bit string by the second bit string position permutation unit and the result of the exclusive OR operation and the auxiliary data stored in the storage apparatus as the template.

According to another aspect of the present invention, there is provided a method by a data processing apparatus including a storage apparatus, the method comprising:

performing position permutation of an input first bit string;

a template generation step to perform an exclusive OR operation of a bit string resulting from the position permutation of the first bit string and a code word of a binary linear code, generating auxiliary data for use in verifying that a hamming distance between bit strings resulting from position permutation operations is not more than a predetermined value, and storing a result of the exclusive OR operation and the auxiliary data in the storage apparatus as a template;

performing same position permutation of an input second bit string as the position permutation applied to the first bit string; and verifying that a hamming distance between the bit string resulting from the position permutation of the second bit string and the bit string used for generation of the template and resulting from the position permutation of the first bit string is not more than the predetermined preset value, upon receipt of the bit string resulting from the position permutation of the second bit string and the result of the exclusive OR operation and the auxiliary data stored in the storage apparatus as the template.

According to still another aspect of the present invention, there is provided a bit string collation program to cause a computer to execute the processing comprising:

a first bit string position permutation process to perform position permutation of an input first bit string;

a template generation process to perform an exclusive OR operation of a bit string resulting from the position permutation of the first bit string in the first bit string position permutation process and a code word of a binary linear code, generate auxiliary data for use in verifying that a hamming distance between bit strings resulting from position permutation operations is not more than a predetermined preset value, and store a result of the exclusive OR operation and the auxiliary data in a storage apparatus as a template;

a second bit string position permutation process to perform same position permutation of an input second bit string as the position permutation in the first bit string position permutation process; and a bit string collation process to verify that a hamming distance between a bit string resulting from the position permutation of the second bit string in the second bit string position permutation process and the bit string used for generation of the template and resulting from the position permutation of the first bit string in the first bit string position permutation process is not more than the predetermined preset value, based on the bit string resulting from the position permutation of the second bit string in the second bit string position permutation process and the result of the exclusive OR operation and the auxiliary data stored in the storage apparatus as the template. According to the present invention, there is provided a computer-readable storage medium such as a semiconductor storage or a magnetic/optical storage medium having the program stored therein.

According to the present invention, when an exclusive OR of an input bit string and a code word of a binary linear code is used as a template portion, association between data related to a same bit string enrolled in different systems is made to be difficult, for example, thereby allowing avoidance of information leakage and ensuring of security.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

According to one of exemplary embodiments of the present invention, there are provided
a first bit string position permutation unit (102 in FIG. 2) that performs position permutation of a first bit string received;
a template generation unit (101 in FIG. 2) that performs an exclusive OR operation of a bit string resulting from the position permutation of the first bit string by the first bit string permutation unit (102 in FIG. 2) and a code word of a binary linear code and generates auxiliary data that is used for verifying that a hamming distance between the bit string obtained by the position permutation and a bit string obtained by position permutation is not more than a predetermined preset value, and stores a result of the exclusive OR operation and the auxiliary data in a storage apparatus (400 in FIG. 2) as a template;
a second bit string position permutation unit (202 in FIG. 2) that performs same position permutation of a second bit string received as that by the first bit string position permutation unit (102 in FIG. 2); and a bit string collation unit (301 in FIG. 2) that verifies a hamming distance between a bit string resulting from the position permutation of the second bit string by the second bit string position permutation unit (202 in FIG. 2) and the bit string used for generation of the templates and resulting from the position permutation of the first bit string by the first bit string position permutation unit (102 in FIG. 2) is not more than a predetermined preset value, based on the bit string resulting from the position permutation of the second bit string by the second bit string position permutation unit (202 in FIG. 2), and the result of the exclusive OR operation and the auxiliary data stored in the storage apparatus (400 in FIG. 2) as the template.

Figure 2:
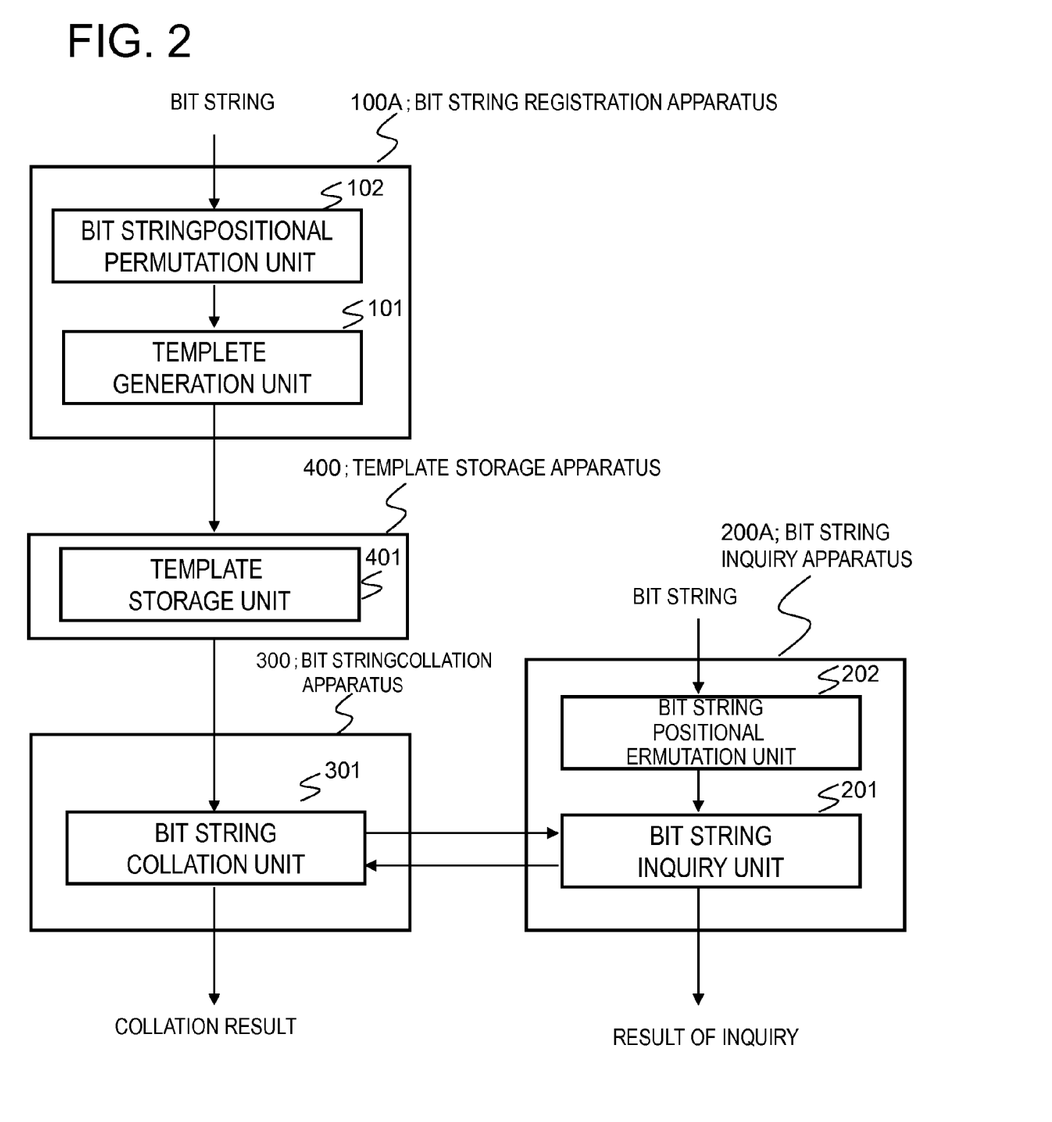
FIG. 2 is a diagram illustrating a configuration of a first exemplary embodiment of the present invention.

According to one of exemplary embodiments of the present invention, each of the first and second bit string position permutation unit (102 and 202 in FIG. 2) may use position permutation including bit inversion. Alternatively, each of the first and second bit string position permutation unit (102 and 202 in FIG. 2) may use one of the following position permutations:

position permutation of a bit string, which is different for each system;

position permutation including bit inversion, which is different for each system;

position permutation that is different for each input bit string; and position permutation including bit inversion, which is different for each input bit string.

According to the exemplary embodiment of the present invention, each of the bit string position permutation unit (101 and 202 in FIG. 2) may perform transformation such that an exclusive OR (P1(Z1)(+)P2 (Z2)) of bit strings (P1(Z1), P2(Z2)) resulting from application of first and second position permutations (P1, P2) that are different for each system or each bit string to first and second bit strings (Z1, Z2), corresponds to a hamming distance between the first and second bit strings (Z1, Z2).

The following describes related inventions, each as a premise for the above-mentioned present invention. The present invention is made suitable for being applied to the each of the related inventions that will be described below.

Figure 1:
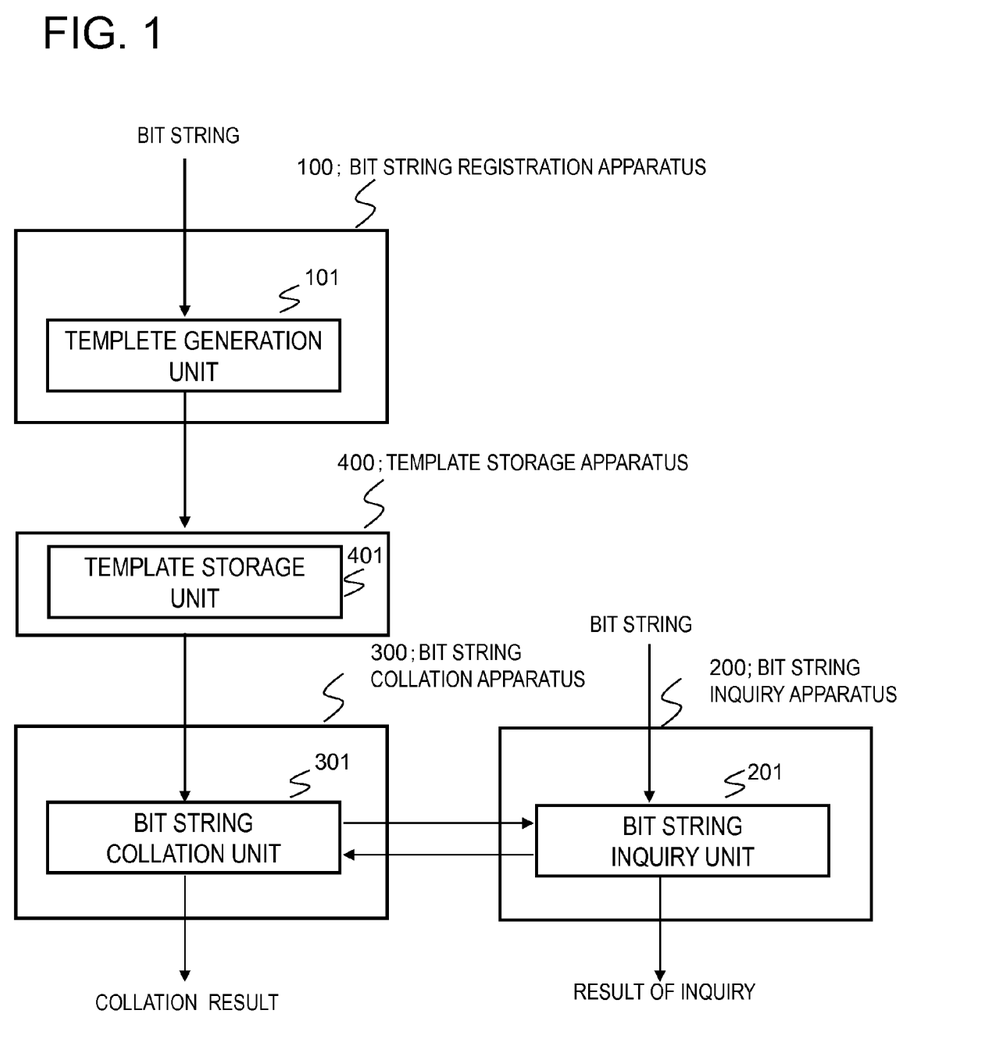
FIG. 1 is a diagram illustrating a configuration of a related invention.

Biometric information is regarded as a binary string of N bits. Related invention 1 involves template registration (Enrollment) and verification (Verification) that will be described below. FIG. 1 is a diagram illustrating Related Invention 1. Referring to FIG. 1, Related Invention 1 includes a bit string registration apparatus (enrollment apparatus) 100, a bit string inquiry apparatus (certification apparatus) 200, a bit string collation apparatus (verification apparatus) 300, and a template storage apparatus 400. The bit string registration apparatus 100 includes a template generation unit 101. The bit string inquiry apparatus 200 includes a bit string inquiry unit 201. The bit string collation apparatus 300 includes a bit string collation unit 301. The template storage apparatus 400 includes a template storage unit 401 that stores one or more templates.

The bit string registration apparatus 100 receives a bit string, supplies the received bit string to the template generation unit 101, and then stores an output of the template generation unit 101 in the template storage apparatus 400.

The template generation unit 101 receives the bit string to output templates including a result of an exclusive OR operation of the bit string and a code word of a binary BCH code.

The bit string inquiry apparatus 200 receives a bit string, supplies the received bit string to the bit string inquiry unit 201, and then outputs an output of the bit string inquiry unit 201. The bit string inquiry unit 201 transmits and receives data with the bit string collation unit 301, using the bit string as an input, and then outputs a result of inquiry.

Using the bit string collation unit 301, the bit string collation apparatus 300 transmits and receives the data with the bit string inquiry unit 201 and receives data from the template storage apparatus 400 and then outputs a collation result. The bit string collation unit 301 communicates with the bit string inquiry unit 201, and then outputs the collation result. When a hamming distance between a bit string (Z) used for generation of the templates and the bit string (Z') supplied to the bit string inquiry unit 201 is not more than d with respect to a result of an exclusive OR operation of the bit string (Z'), the bit string (Z), and the code word of the binary BCH code, the bit string inquiry unit 201 and the bit string collation unit 301 determine that two bit strings (Z and Z') match.

Enrollment of the templates for the binary string Z (input bit string data) of N bits is performed by the bit string registration apparatus 100 as follows.

A random number S of N bits is generated as a key. A code word C of N bits obtained by encoding S with a binary BCH code is computed. The binary BCH code used herein is a code configured to output data of N bits (N>K) using data of K bits as an input. It is assumed that any code words that are different to each other are guaranteed to have a hamming distance not less than at least d.

Next, encrypted data W1 of N bits obtained by taking an exclusive OR of the code word C and the bit string Z is computed.

$$W1=C(+)Z \tag{1}$$

Next, W2 is computed according to the following formula, using S and W1 as inputs.

$$W2=(c,S)(+)h(W1,n) \tag{2}$$

Here, c is a constant of K bits, and (c, S) represents an inner product of c and S. An inner product (X, Y) is an inner product between X and Y (the operation is performed under a Galois extension field GF($2^k$), where ^ indicates a power operation), in the case wherein each of X and Y that are both K=m*k bits data, is divided for each k bits and is regarded as m vectors. n is a random number of k bits (k being a security parameter). The security parameter is a parameter for specifying security strength, and is a value determined in advance by the system. h is assumed to be a cryptographic hash function (such as SHA-256).

Next, a random number r of (K−k) bits is generated. Then, with respect to the random number r, binary BCH encoding is applied to:

$$h(W1,n)\|r \tag{3}$$

to obtain a code word C3. (∥ is an operation symbol indicating bit connection (concatenation)). W3 is computed according to the following expression, using the code word data C3 and the bit string Z:

$$W3=C3(+)Z \tag{4}$$

The encrypted data W1 obtained by the above operation is a ciphertext of the bit string Z. W2 and W3 are auxiliary data. W1, W2, and W3 are the templates.

It is assumed that the above described processing is executed by the bit string registration apparatus 100 in FIG. 1, and that the generated templates are stored in the template storage apparatus (400 in FIG. 1).

Verification (Verification) of whether or not a hamming distance between N bits binary string (bit string) Z used for generation of the templates (encrypted data W1 and auxiliary data W2 and W3) and N bits binary string (input bit string) Z' is not more than a predetermined number d, using the templates constituted from W1, W2, and W3 generated by the above processing and the N bits binary string (input bit string) Z', as inputs, is performed as follows, for example.

It is assumed that the process of the verification is performed between two apparatuses that are the certification apparatus (bit string inquiry apparatus 200 in FIG. 1) configured to store the bit string Z' and the verification apparatus (bit string collation apparatus 300 in FIG. 1) having the templates. For explanation of the verification (Verification), H (x, y, z) is defined as a function that is given by the following expression (4):

$$H(x,y,z)=(c,x)(+)h(y,z) \tag{5}$$

H(x, y, z) satisfies the following expression (6):

$$H(a1,b1,c1)(+)H(a2,b2,c2)=H(a1(+)a2,b1,c1)(+)h(b2,c2) \quad (6)$$

(1) The verification apparatus (bit string collation apparatus 300 in FIG. 1) generates a random number ns.
(2) With respect to an element (generator) g of a predetermined group G (multiplicative group Zp=Z/pZ, where p is a predetermined prime number), the verification apparatus computes:

$$g\_s=g^\{ns\} \quad (7)$$

Then, the verification apparatus sends g_s and W3 to the certification apparatus (bit string inquiry apparatus 200 in FIG. 1). The value of g_s=g^{ns} is evaluated with modulo p operation.
(3) The certification apparatus (bit string inquiry apparatus 200 in FIG. 1) computes:

$$W3(+)Z' \quad (8)$$

Then, the certification apparatus applies binary BCH code decoding processing to W3(+)Z' to obtain a decoded result h'.
(4) The certification apparatus (bit string inquiry apparatus 200 in FIG. 1) generates a random number S' of K bits.
(5) The certification apparatus (bit string inquiry apparatus 200 in FIG. 1) generates a code word C' obtained by performing error correcting coding on the random number S' using the binary BCH code.
(6) The certification apparatus (bit string inquiry apparatus 200 in FIG. 1) generates a value W1' obtained by taking an exclusive OR of C' and Z'.

$$W'=C(+)Z' \quad (9)$$

(7) The certification apparatus (bit string inquiry apparatus 200 in FIG. 1) generates a random number nc.
(8) The certification apparatus (bit string inquiry apparatus 200 in FIG. 1) computes:

$$g\_c=g^\{nc\} \quad (10),$$

where the value of g_c=g^{nc} is evaluated with modulo p operation.
(9) The certification apparatus (bit string inquiry apparatus 200 in FIG. 1) computes:

$$g\_sc=g\_s^\{nc\} \quad (11),$$

where the value of g_sc=g_s^{nc} is evaluated with modulo p operation.
(10) The certification apparatus (bit string inquiry apparatus 200 in FIG. 1) computes:

$$W2'=H(S',W1',g\_sc)(+)h' \quad (12)$$

(11) The certification apparatus (bit string inquiry apparatus 200 in FIG. 1) sends W1', W2', and g_c to the verification apparatus (bit string collation apparatus 300 in FIG. 1).
(12) The verification apparatus (bit string collation apparatus 300 in FIG. 1) computes:

$$W1'(+)W1 \quad (13)$$

(13) The verification apparatus (bit string collation apparatus 300 in FIG. 1) applies the binary BCH code decoding processing to W1'(+)W1 to compute T that is a decoded result of a difference between two encrypted data W1' and W1.
(14) The verification apparatus (bit string collation apparatus 300 in FIG. 1) computes the following value, using T, W1', and g_c^ ns:

$$H(T,W1',g\_c^{ns}) \quad (14)$$

(15) The verification apparatus (bit string collation apparatus 300 in FIG. 1) computes an exclusive OR of a computation result of the expression (14) and W2':

$$H(T,W1',g\_c^{ns})(+)W2' \quad (15)$$

Then, the verification apparatus checks whether or not the expression (15) is equal to W2. That is, the verification apparatus checks whether or not the following Expression (16) holds:

$$W2=H(T,W1',g\_c^{ns})(+)W2' \quad (16)$$

(16) The verification apparatus (bit string collation apparatus 300 in FIG. 1) determines that the hamming distance between the bit string Z and the bit string Z' is not more than d, when the expression (16) holds. It is presupposed that a method whereby a hamming distance between any code words that are different to each other exceeds at least d is employed for the binary BCH coding.

Related Invention 1 performs verification (Verification) for a binary string and a specific template. When collation of this type is performed using a database, templates that have been generated for a preset binary string may be searched. When Related Invention 1 is used in that case, the process of the verification is to be executed for each of all the templates. As described above, the verification apparatus (bit string collation apparatus 300 in FIG. 1) and the certification apparatus (bit string inquiry apparatus 200 in FIG. 1) send g_s (=g^{ns}, where ns is a private key) and g_c (=g^{nc}, where nc is a private key), respectively, to the certification apparatus (bit string inquiry apparatus 200 in FIG. 1) and the verification apparatus (bit string collation apparatus 300 in FIG. 1), with an element (generator) g of the multiplicative group Zp and a prime number p being made laid open (public), and the verification apparatus (bit string collation apparatus 300 in FIG. 1) and the certification apparatus (bit string inquiry apparatus 200 in FIG. 1) respectively calculate g_c^{ns}=g^{nc*ns} (mod p) and g_s^{nc}=g^{ns*nc} (mod p) to use the calculation result as a shared secret key (g_c^{ns}=g_s^{nc}=g^{nc*ns}). These procedures performed by the verification apparatus (bit string collation apparatus 300 in FIG. 1) and the certification apparatus (bit string inquiry apparatus 200 in FIG. 1) correspond to Diffie-Hellman key exchange protocol.

In Related Invention 2, a verification process for a certain binary string and a plurality of templates is efficiently executed. Related Invention 2 involves template registration (Enrollment) and verification (Verification) that will be described below.

Enrollment of templates for the binary string (input bit string) Z of the N bits is performed as follows:
(1) The random number S of the K bits is generated as the key.
(2) The code word C of N bits obtained by coding the random number S by the binary BCH code is computed. The binary BCH code used herein is the code configured to output data of N bits (N>K) using data of K bits as an input. It is assumed that any code words that are different to each other are guaranteed to have a hamming distance not less than at least d.
(3) Next, the encrypted data W1 of the N bits obtained by taking an exclusive OR of the code word C and the input bit string Z is computed.

$$W1=C(+)Z \quad (17)$$

(4) W2 is computed according to the following formula (18), using the binary string Z, the random number S, and the encrypted data W1 as inputs. Expression (18) is the same as the above-mentioned Expression (2), c is the constant of the K bits, and n is the random number of the k bits (where k is the security parameter). It is assumed that h is the cryptographic hash function (such as SHA=256).

$$W2=(c,S)(+)h(W1,n) \quad (18)$$

(5) Next, the random number r of the (K−k) bits is generated. The binary BCH encoding is applied to:

$$h(W1,n)\|r \quad (19)$$

to obtain C3.

(6) Using C3 and Z, W3 is computed according to the following expression:

$$W3=C3(+)Z \quad (20)$$

W1 obtained by the above-described operation is a ciphertext of the binary string (input bit string) Z, W2 and W3 are auxiliary data, and W1, W2, and W3 are templates.

It is assumed that the above process is executed by the template generation unit 101 of the bit string registration apparatus 100 in FIG. 1, and that the generated templates are stored in the template storage unit (401 in FIG. 1).

Verification (Verification) of whether or not a hamming distance between the binary string (input bit string) used for generation of each template and the N bits binary string (input bit string) Z' that has been received this time is not more than a predetermined number d, using the plurality of templates generated by the above process and the N bits binary string (input bit string) Z', as the inputs, is performed as follows. An identifier i is assigned to each template. With this arrangement, each template is assumed to be uniquely called from the database. The templates W1, W2, and W3 associated with an identifiers i are respectively represented by W1[i], W2[i], and W3[i].

It is assumed that the process of the verification is performed between two apparatuses that are the certification apparatus (bit string inquiry apparatus 200 in FIG. 1) configured to store the bit string Z' and the verification apparatus (bit string collation apparatus 300 in FIG. 1) including the templates.

(1) The verification apparatus (bit string collation apparatus 300 in FIG. 1) generates the random number ns.

(2) With respect to the element (generator) g of the predetermined group G (multiplicative group Zp), the verification apparatus (bit string collation apparatus 300 in FIG. 1) computes:

$$g\_s=g^\wedge\{ns\} \quad (21)$$

Then, the verification apparatus transmits g_s to the certification apparatus (bit string inquiry apparatus 200 in FIG. 1).

(3) The certification apparatus (bit string inquiry apparatus 200 in FIG. 1) generates the random number S' of the K bits.

(4) The certification apparatus (bit string inquiry apparatus 200 in FIG. 1) randomly selects S1' and S2' that satisfy the following expression:

$$S'=S1'(+)S2' \quad (22)$$

(5) The certification apparatus (bit string inquiry apparatus 200 in FIG. 1) generates the code word C' obtained by performing error correcting coding on the random number S' using the binary BCH code.

(6) The certification apparatus (bit string inquiry apparatus 200 in FIG. 1) generates a value W1' obtained by taking an exclusive OR of C' and Z'.

$$W'=C'(+)Z' \quad (23)$$

(7) The certification apparatus (bit string inquiry apparatus 200 in FIG. 1) generates the random number nc.

(8) The certification apparatus (bit string inquiry apparatus 200 in FIG. 1) computes:

$$g\_c=g^\wedge\{nc\} \quad (24)$$

(9) The certification apparatus (bit string inquiry apparatus 200 in FIG. 1) computes:

$$g\_sc=g\_s^\wedge\{nc\} \quad (25)$$

(10) The certification apparatus (bit string inquiry apparatus 200 in FIG. 1) computes:

$$W2'=H(S',W1',g\_sc) \quad (26)$$

(11) The certification apparatus (bit string inquiry apparatus 200 in FIG. 1) computes an inner product (of K bits) between c and S2':

$$(c,S2') \quad (27)$$

(12) The certification apparatus (bit string inquiry apparatus 200 in FIG. 1) generates a random number r' of (K−k) bits.

(13) The certification apparatus (bit string inquiry apparatus 200 in FIG. 1) computes data C3 obtained by performing encoding with a binary BCH coding scheme to:

$$(c,S2')\|r' \quad (28)$$

(where ∥ indicates bit concatenation).

(14) The certification apparatus (bit string inquiry apparatus 200 in FIG. 1) computes:

$$W3'=C3(+)Z' \quad (29)$$

(15) The certification apparatus (bit string inquiry apparatus 200 in FIG. 1) sends W1', W2', and W3' to the verification apparatus (bit string collation apparatus 300 in FIG. 1).

(16) The verification apparatus (bit string collation apparatus 300 in FIG. 1) executes the following processes (16-a) to (16-h) for the templates W1[i], W2[i], and W3[i] and outputs all identifiers i for which the hamming distance between Z' and Z used for generation of each template has been determined to be not more than d.

(16-a) The following formula is computed:

$$W1'(+)W1[i] \quad (30)$$

(16-b) A decoding processing with binary BCH coding scheme is applied to W1'(+)W1[i] to compute W1.

(16-c) The following formula is computed:

$$W3'(+)W3[i] \quad (31)$$

(16-d) The decoding processing with binary BCH code scheme is applied to W3' (+) W3 [i] to compute W3.

(16-e) With respect to the element (generator) g of the predetermined group G (multiplicative group Zp), the verification apparatus computes:

$$g\_sc=g\_c^\wedge\{ns\} \quad (32)$$

(16-f)

$$W2''=H(W1,S1,g\_sc) \quad (33)$$

(16-g) It is checked whether the following expression holds:

$$W2'=W2''(+)W(+)W3 \quad (34)$$

(16-h) When the above-mentioned formula holds, it is determined that the hamming distance between the input bit strings Z and Z' is not more than d.

In the related inventions, when the code word of the binary BCH code is set to the code word C, the templates for the bit string Z includes C(+)Z as a portion of the templates. C(+)Z corresponds to W1 in Related Invention 1, and corresponds to W1 and W3 in Related Invention 2.

The above-mentioned Related Inventions 1 and 2 are based on examples 1 and 2 of the earlier application (JP Patent Application JP2012-157265: now published as WO2014/010725A1, Patent Literature 2) including the inventors of the present application as inventors.

As described above, it is assumed, by an exclusive OR (bitwise Exclusive OR) operation of code words C1 and C2 of a binary BCH code that are independent, C1(+)Z1 and C2(+)Z2 are respectively generated as the cyphertexts to be generated for the first bit string Z1 and the second bit string Z2. Since the binary BCH code is a linear code, C1(+)C2 is also a code word. Z1(+)Z2 is a bit string having 1 or is whose number is equal to the hamming distance between the bit strings Z1 and Z2.

C1(+)C2(+)Z1(+)Z2 can be decoded by the binary BCH code decoding processing when the hamming distance of Z1(+)Z2 is not more than d. On the other hand, when the hamming distance of Z1(+)Z2 is larger than d, C1(+)C2(+)Z1(+)Z2 cannot be decoded by the binary BCH code decoding processing. When two cyphertexts (encrypted data) are obtained, it can be determined that a hamming distance between bit strings used for generation of those cyphertexts is close. This means that information on the bit strings can be obtained from the cyphertexts. Then, in contradistinction to the related inventions, according to the present invention, there is provided a system, a method, and a program configured to make it difficult to associate data related to a same bit string enrolled in different systems or the like when a result of an exclusive OR of an input bit string and a code word of the binary code (binary linear code) is used as a template portion, thereby allowing avoidance of information leakage and ensuring of security.

The following describes embodiments of the present invention will be described, with reference to FIG. 2. Referring to FIG. 1 of the above-mentioned related invention, a bit string is directly supplied to each of the bit string registration apparatus 100 configured to generate templates from the bit string and enroll the templates and the bit string inquiry apparatus 200 configured to inquire the bit string that has been received. According to the present invention, the bit string position permutation unit 102 of a bit string registration apparatus 100A and the bit string position permutation unit 202 of a bit string inquiry apparatus 200A differ for each system, for example. The bit string position permutation unit 102 and the bit string position permutation unit 202 apply, to two arbitrary bit strings that have been received, transformations (bit string position permutations) whereby a hamming distance between the received bit strings does not greatly change even after the transformation, and supply bit strings resulting from the position permutations of the received bit strings to the template generation unit 101 of the bit string registration apparatus 100A and the bit string inquiry unit 201 of the bit string inquiry apparatus 200A. This makes it difficult to associate data related to a same bit string enrolled in different systems, for example.

Specifically,
(A) by executing a bit string registration process (template generation and registration process) and a bit string inquiry process, after position permutation, which is random for each system, has been applied to each input bit string, for example, the problem is solved (in a first exemplary embodiment).
(B) by executing a bit string registration process (template generation and registration process) and a bit string inquiry process, after application of position permutation including bit inversion to each input bit string, the problem is solved (in a second exemplary embodiment).

A description will be given below about how the problem is solved by each of the above-mentioned methods.

Assuming that a position permutation P of a bit string is a function (re-arrangement (permutation) function) configured to permute only positions in an input bit string, a hamming distance between a bit string P(A) resulting from position permutation of a first bit string A using the function P and a bit string P(B) resulting from position permutation of a second bit string B using the function P is equal to a hamming distance between the first bit string A and the second bit string B. Accordingly, even if the position permutation that is different for each system is applied to each of bit strings before being received by the bit string registration apparatus and the bit string inquiry apparatus (certification apparatus), the bit strings within the same system can be collated.

Next, a description will be given about difficulty in determining whether or not bit strings registered in templates generated in different systems are the same.

A description will be given about a case where the bit string registration apparatus performs encryption respectively using:
a position permutation P1 for a bit string Z1
a position permutation P2 for a bit string Z2.
It is assumed that the position permutations P1 and P2 are different. Encrypted data of the bit string Z1 and the bit string Z2 are generated by the code words C1 and C2 of the binary BCH code that are independent.

$$C1(+)P1(Z1) \qquad (35)$$

$$C2(+)P2(Z2) \qquad (36)$$

The binary BCH code is a linear code, and hence $$C1(+)C2$$

is also a code word. The position permutation P1 and the position permutation P2 are different and thus, $$P1(Z1)(+)P2(Z2) \qquad (37)$$

does not represent a hamming distance between Z1 and Z2.

Accordingly, usage of an exclusive OR: P1(Z1)(+)P2(Z2) of the bit string P1(Z1) and P2(Z2) respectively resulting from the position permutation of the bit string Z1 and Z2, cannot allow to determine similarity between the bit string Z1 and the bit string Z2.

In order to arrange P1(Z1)(+)P2(Z2) to correspond to closeness (hamming distance) between the bit string Z1 and the bit string Z2, a position permutation that causes the following expression (38) to hold may be employed for an arbitrary character string (bit string) Z, for example:

$$P12(P1(Z))=P2(Z) \qquad (38)$$

Regarding the bit string P1(Z) obtained by applying the position permutation P1 to the bit string Z, a result obtained by further applying a position permutation P12 to the bit string P1(Z) matches the bit string P2(Z) resulting from application of the position permutation P2 to the original bit string Z.

When this position permutation P12 is applied to the following encrypted data:

$$C1(+)P1(Z1) \qquad (39)$$

the following result is obtained:

$$P12(C1(+)P1(Z1))=P12(C1)(+)P2(Z1) \qquad (40)$$

$$\text{In } P12(C1)(+)P2(Z1)(+)C2(+)P2(Z2) \qquad (41)$$

P2(Z1)(+)P2(Z2) corresponds to the hamming distance between the bit string Z1 and the bit string Z2 (in which the number of 1s is reduced as the hamming distance decreases). That is, the exclusive OR of the bit string P1(Z1) and the bit string P2(Z2) resulting from the position permutations of the bit strings corresponds to a hamming distance between the bit string P2(Z1) and the bit string P2(Z2). As above described, this hamming distance corresponds to the hamming distance between the bit strings Z1 and Z2.

However, P12(C1)(+)C2 in Expression (41) is not the binary BCH code. For this reason, information on the bit strings Z1 and Z2 cannot be extracted by using a decoding processing of a binary BCH code.

In a position permutation including bit inversion, there is a permutation in which a bit in a specified position is replaced by a bit in a different position, and which includes bit inversion of a value in the specified position. Even if this position permutation is applied, a hamming distance after application of the same position permutation remains unchanged.

Figure 6A:
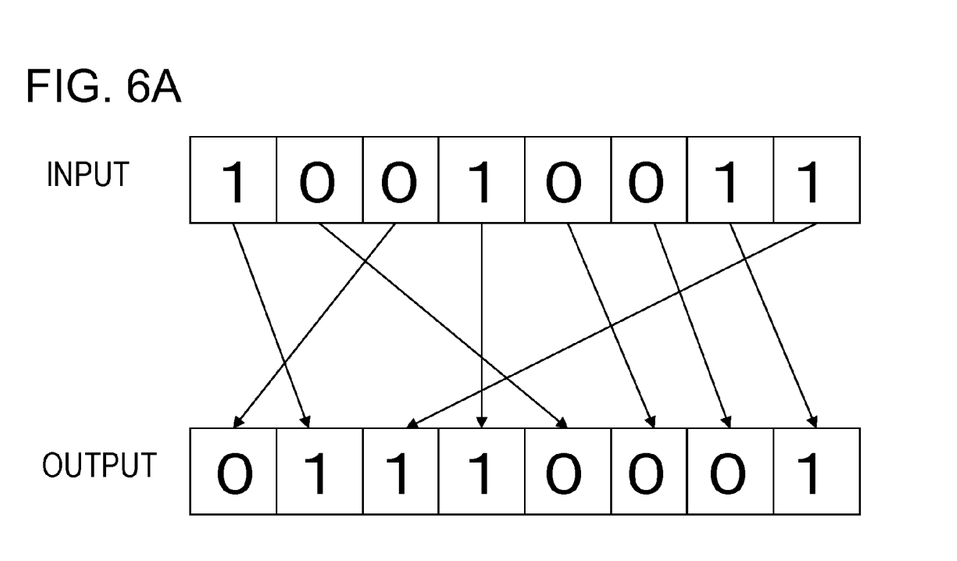
FIG. 6A is a diagram illustrating the principle of positional permutation.

In the position permutation (simple position permutation), only the positional relationship of an input bit string is changed. The position permutation can be represented by specifying from what-numbered bit each input bit is to be output without overlapping of output bits. In the case of eight bits input and eight bits output, for example, as illustrated in FIG. 6A, one position permutation as an example of the position permutation can be specified by information instructing as follows from the left of FIG. 6A:

to output an input in a first bit position from a second bit position;

to output an input in the second bit input position from a fifth bit position;

to output an input in a third bit position from the first bit position;

to output an input in a fourth bit position from the fourth bit position;

to output an input in a fifth bit position from a sixth bit position; to output an input in the sixth bit position from a seventh bit position;

to output an input in the seventh bit position from an eighth bit position; and to output an input in the eighth bit position from the third bit position.

Figure 6B:
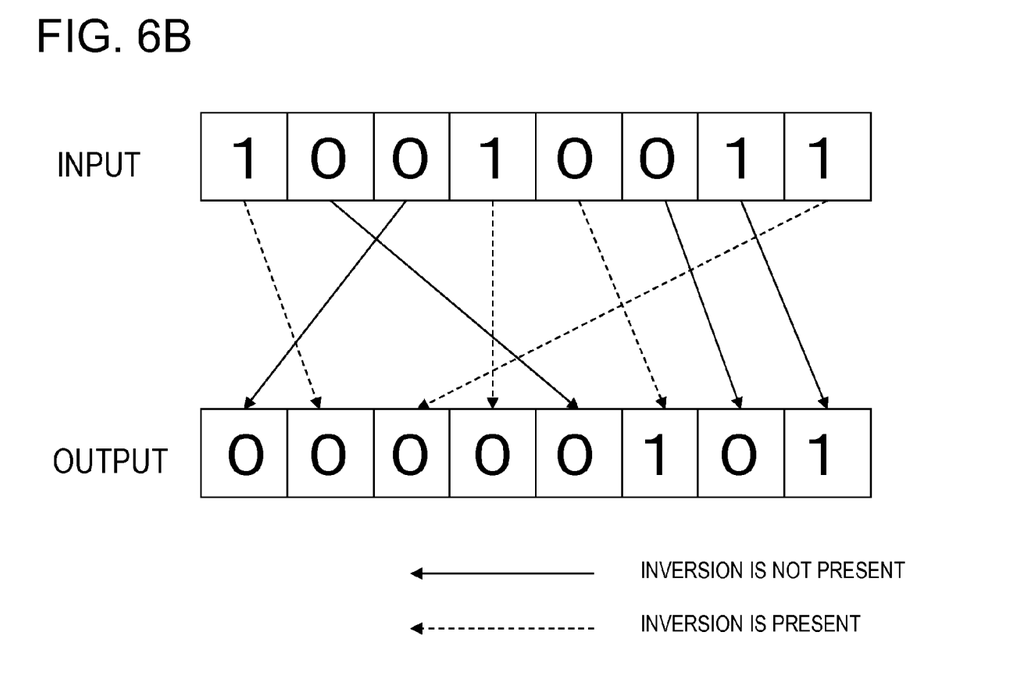
FIG. 6B is a diagram illustrating the principle of positional permutation including bit inversion.

On the other hand, the position permutation including bit inversion is position permutation to which information on whether or not to invert each bit is added. In the case of input of eight bits and output of eight bits, for example, as illustrated in FIG. 6B, one position permutation as an example of the position permutation including bit inversion can be specified as follows from the left of FIG. 6B:

to output an input in a first bit position from a second bit position, and to execute the bit inversion (the inversion is present, as indicated by a broken line arrow);

to output an input in the second bit input position from a fifth bit position, and not to execute the bit inversion (the inversion is not present, as indicated by a solid line arrow);

to output an input in a third bit position from the first bit position, and not to execute the bit inversion;

to output an input in a fourth bit position from the fourth bit position, and to execute the bit inversion;

to output an input in a fifth bit position from a sixth bit position, and to execute the bit inversion;

to output an input in the sixth bit position from a seventh bit position, and not to execute the bit inversion;

to output an input in the seventh bit position from an eighth bit position, and not to execute the bit inversion; and to output an input in the eighth bit position from the third bit position, and to execute the bit inversion. In this manner, in the position permutation including bit inversion, whether or not to invert each bit is added to information indicating at which position each bit is to be disposed. Thus, the total number of position permutations including bit inversion is larger than the number of simple position permutations. For this reason, the position permutation including bit inversion may preferably be used, when different position permutations are to be specified for a lot of systems, for example.

The above-mentioned method in general can be applied to a bit string collation system including as a template a result of an exclusive OR operation of a bit string and a code word of a binary linear code.

First Exemplary Embodiment

A first exemplary embodiment makes it difficult to associate data related to a same bit string enrolled in different apparatuses or the like, in contradistinction to the configuration in FIG. 1. FIG. 2 is a block diagram illustrating an arrangement in the first exemplary embodiment. There is implemented a bit string collation system that makes it difficult to have association on data that are related to a same bit string and registered in the different systems. Referring to FIG. 2, the first exemplary embodiment includes a bit string registration apparatus 100A, a bit string inquiry apparatus 200, a bit string collation apparatus 300, and a template storage apparatus 400.

The bit string registration apparatus 100A includes a template generation unit 101 and a bit string position permutation unit 102.

The bit string inquiry apparatus 200A includes a bit string inquiry mans 201 and a bit string position permutation unit 202.

The bit string collation apparatus 300 includes a bit string collation unit 301.

The template storage apparatus 400 includes a template storage unit 401.

The bit string registration apparatus 100A receives a bit string (Z), and then supplies the received bit string (Z) to the bit string position permutation unit 102. An output of the bit string position permutation unit 102 is supplied to the template generation unit 101. The template generation unit 101 stores a generated template in the template storage apparatus 400. The bit string position permutation unit 102 receives the bit string (Z) and outputs a bit string in which position permutation of the bit string (Z) has been performed in a predetermined order.

The template generation unit 101 receives the bit string resulting from position permutation of the bit string (Z) by the bit string position permutation unit 102, and outputs the template including auxiliary data and a result (encrypted data) of an exclusive OR of the bit string and a code word of a binary BCH code. The template generation unit 101 is same as the template generation unit 101 of the related invention in FIG. 1, for example. The template generation unit 101 stores W1 (encrypted text), and W2 and W3 (auxiliary data) in the above-listed Expressions (1), (2), and (4), or the above-listed Expressions (17), (18) and (20) as the template in the template storage apparatus 400.

The bit string inquiry apparatus 200A receives a bit string (Z'), and supplies the received bit string (Z') to the bit string position permutation unit 202. An output of the bit string position permutation unit 202 is supplied to the bit string inquiry unit 201. An output of the bit string inquiry unit 201 is output as a result of inquiry. The bit string inquiry unit 201 receives a bit string resulting from position permutation of the bit string (Z') by the bit string position permutation unit 202, transmits and receives data with the bit string collation unit 301, and outputs the result of inquiry. The bit string collation apparatus 300 transmits and receives the data with the bit string inquiry unit 201 and receives data from the template storage apparatus 400, using the bit string collation unit 301, and outputs a collation result.

The bit string collation unit 301 communicates with the bit string inquiry unit 201 and outputs the collation result.

The bit string inquiry unit 201 and the bit string collation unit 301 in the first exemplary embodiment are the same as the bit string inquiry unit 201 and the bit string collation unit 301 in FIG. 1. The bit string collation unit 301 determines that a hamming distance between the bit string Z and the bit string Z' is not more than d (the bit strings Z and Z' match) when the above-listed Expression (16) or the above-listed Expression (34) holds, for example.

Figure 3A:
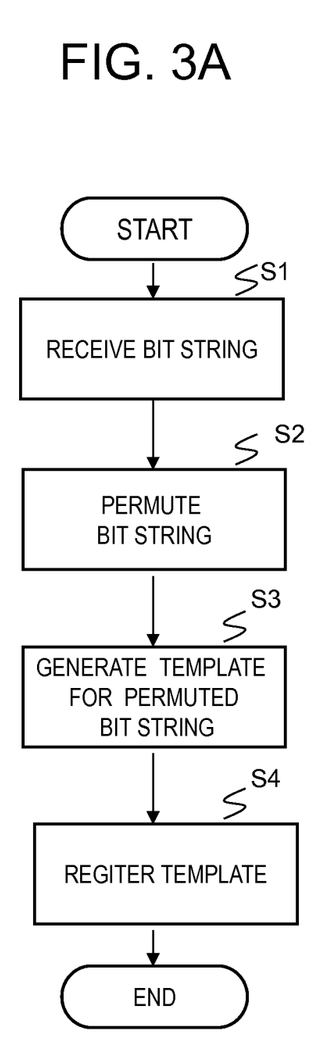
FIG. 3A is a flowchart illustrating registration operation of the first exemplary embodiment of the present invention.

Next, operation of the first exemplary embodiment of the present invention will be described in detail, with reference to flowcharts in FIGS. 3A and 3B. FIG. 3A is a flowchart illustrating an registration process in the first exemplary embodiment of the present invention.

The bit string Z is received by the bit string registration apparatus 100A (in step S1 ).

Next, the bit string registration apparatus 100A supplies the bit string Z to the bit string position permutation unit 102. The bit string position permutation unit 102 outputs the bit string Z' in which position permutation of the bit string Z has been performed according to the predetermined order (in step S2).

Next, the bit string registration apparatus 100A supplies the bit string Z' output from the bit string position permutation unit 102 to the template generation unit 101. The template generation unit 101 outputs a template T for the bit string Z' (in step S3).

Next, the bit string registration apparatus 100A stores the template T in the template storage apparatus 400 (in step S4).

Figure 3B:
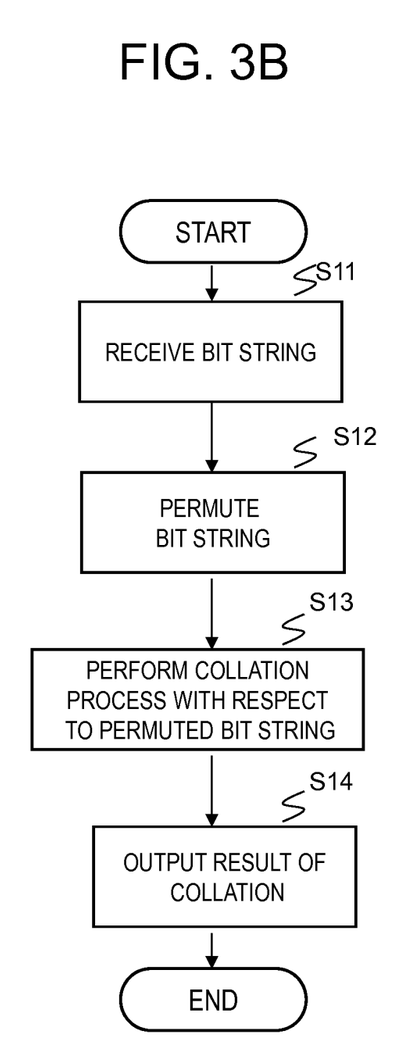
FIG. 3B is a flowchart illustrating collation operation of the first exemplary embodiment of the present invention.

FIG. 3B is a flowchart illustrating operation of a bit string collation process in the first exemplary embodiment.

First, the bit string Z is received by the bit string inquiry apparatus 200A (in step S11).

Next, the bit string inquiry apparatus 200A supplies the bit string Z to the bit string position permutation unit 202. The bit string position permutation unit 202 outputs the bit string Z' in which position permutation of the bit string Z has been permuted according to the predetermined order (in step S12).

Next, the bit string inquiry apparatus 200A supplies the bit string Z' to the bit string inquiry unit 201 to communicate data with the bit string collation unit 301 (in step S13).

The bit string collation apparatus 300 outputs a collation result (in step S14). The bit string collation unit 301 of the bit string collation apparatus 300 determines that the hamming distance between the bit strings Z and Z' is not more than d (the bit strings Z and Z' match) when the above-listed Expression (16) or the above-listed Expression (34) holds. At this point, the bit string inquiry apparatus 200A may output the result of inquiry.

In the first exemplary embodiment, processes and functions of the bit string registration apparatus 100A, the bit string inquiry apparatus 200A, and the bit string collation apparatus 300 may be implemented by a program to be executed on a computer. In this case, a medium (such as a semiconductor memory, or a magnetic or optical disk) with the program stored therein is provided.

Second Exemplary Embodiment

Figure 4:
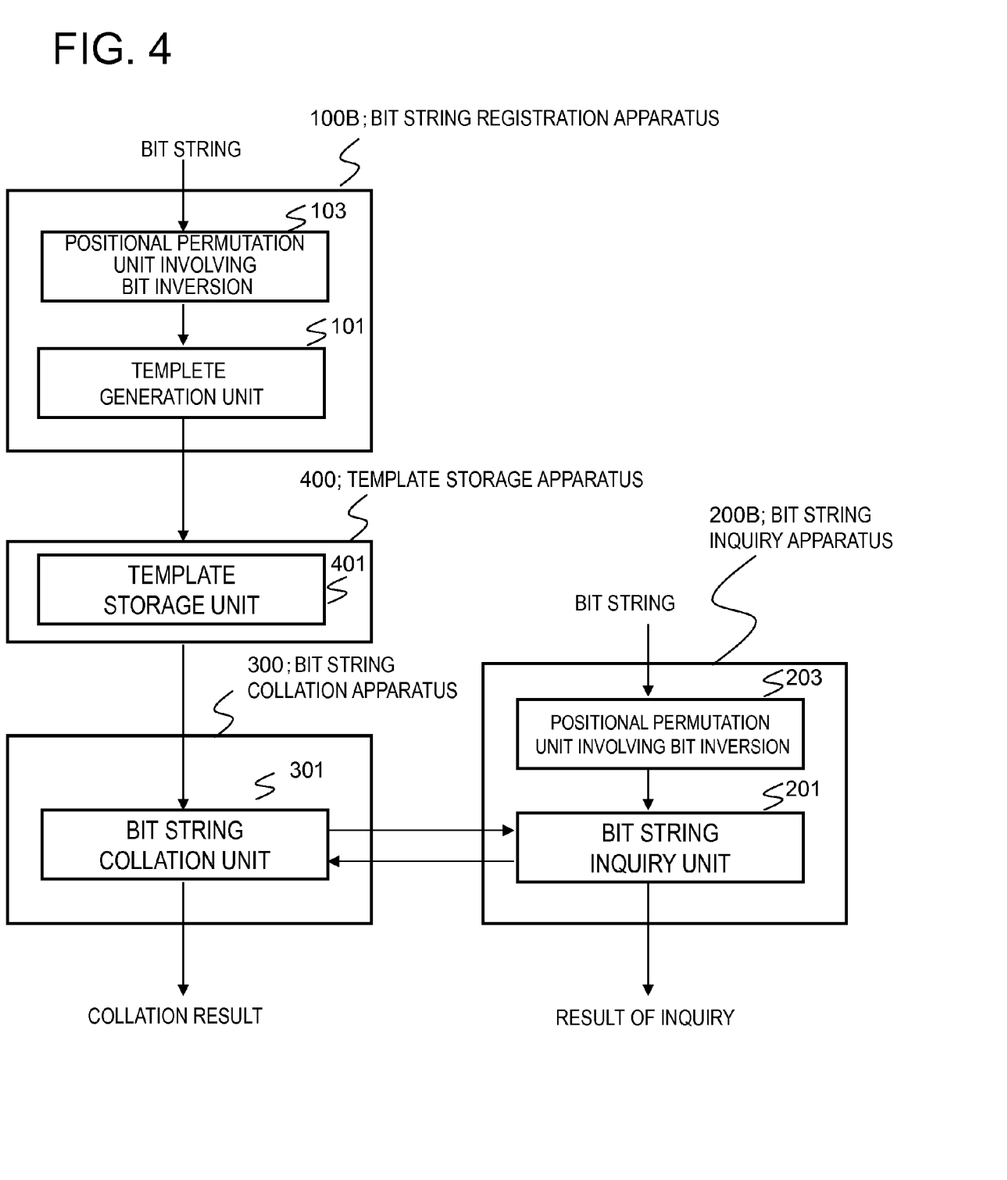
FIG. 4 is a diagram illustrating a configuration of a second exemplary embodiment of the present invention.

Next, a second exemplary embodiment will be described. FIG. 4 is a diagram illustrating a configuration of the second exemplary embodiment. Referring to FIG. 4, in the second exemplary embodiment, a bit string registration apparatus 100B includes a position permutation unit 103 to execute position permutation including bit inversion, in place of the bit string position permutation unit 102 in FIG. 2. A bit string inquiry apparatus 200B includes position permutation unit 203 to execute position permutation including bit inversion, in place of the bit string position permutation unit 202 in FIG. 2.

Figure 5A:
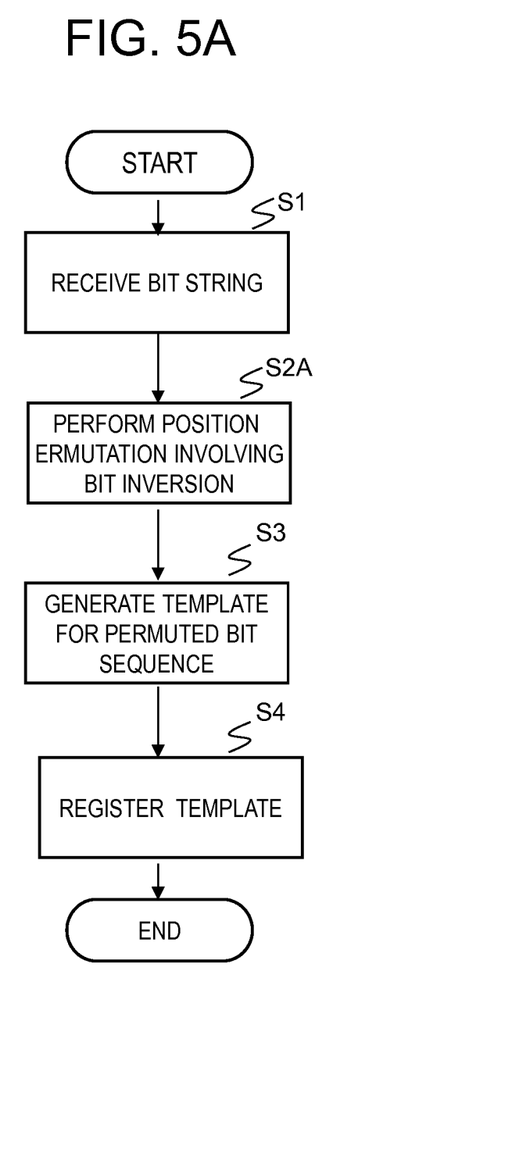
FIG. 5A is a flowchart illustrating registration operation of the second exemplary embodiment of the present invention.
Figure 5B:
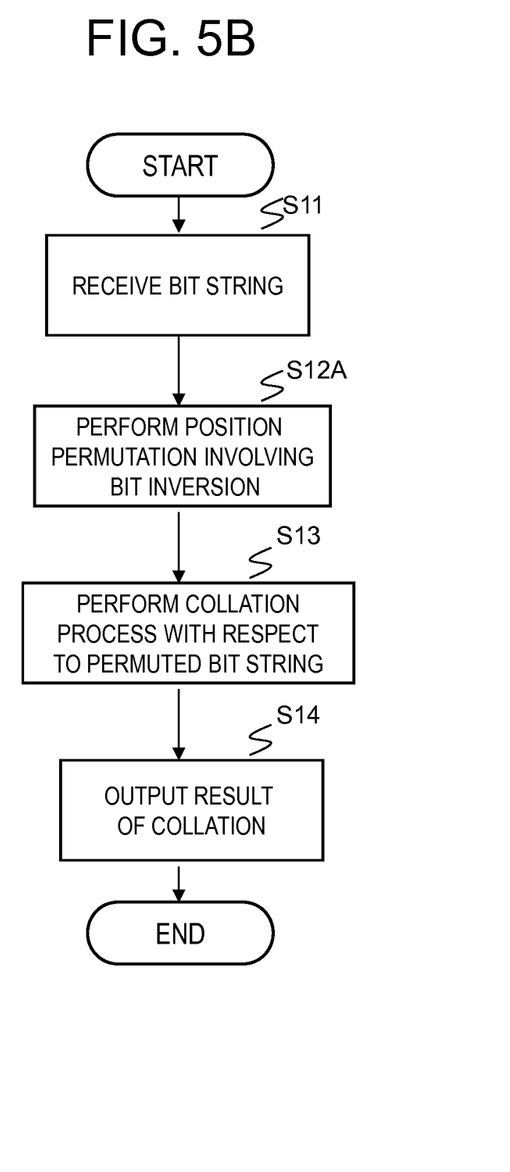
FIG. 5B is a flowcharts illustrating collation operation of the second exemplary embodiment.

FIG. 5A and FIG. 5B are flowcharts respectively illustrating operations of an registration process and a bit string collation process in the second exemplary embodiment.

Referring to FIG. 5A, the bit string registration apparatus 100B receives a bit string Z (in step S1). Then, the position permutation unit 103 outputs a bit string Z' in which position permutation including bit inversion of the bit string Z has been performed according to a predetermined order by the position permutation unit 103 (in step S2A). The template generation unit 101 generates a template for a bit string whose position permutation has been performed (in step S3), and then stores the generated template in a template recording apparatus 400.

Referring to FIG. 5B, the bit string Z is received by the bit string inquiry apparatus 200B (in step S11). The bit string Z is supplied to the position permutation unit 203 in the bit string inquiry apparatus 200B. The position permutation unit 203 involving bit inversion outputs the bit string Z' in which position permutation including bit inversion of the bit string Z has been performed according to the predetermined order (in step S12A).

The bit string inquiry apparatus 200B supplies the bit string Z' to the bit string inquiry unit 201, and exchanges data with the bit comparison unit 301, using the bit string Z' as an input (in step S13).

The bit string collation apparatus 300 outputs a collation result (in step S14). The bit string collation unit 301 of the bit string collation apparatus 300 determines that a hamming distance between the bit strings Z and Z' is not more than d (the bit strings Z and Z' match) when the above-listed Expression (16) or the above-listed Expression (34) holds. At this point, the bit string inquiry apparatus 200B may output a result of inquiry.

Position permutation or position permutation including bit inversion that is different for each bit string rather than for each system as in each of the first exemplary embodiment and the second exemplary embodiment may be applied. Use of such a method can make it difficult to check whether or not a distance between a bit string ZA and a bit string ZB is close by application of decoding processing, even within a same system, wherein an exclusive OR is applied to an exclusive OR result of a bit string ZA and a code word of a binary BCH error correcting code that are both included in a template A, and an exclusive OR result of a bit string ZB and a code word of the binary BCH error correcting code that are both included in a template B. The method of getting through a collation process related to a bit string at one time as shown in Related Invention 2 cannot be thereby used.

Each of the above-mentioned exemplary embodiments can be applied to a bit string collation system. Further, by using biometric information as a bit string, each of the above-mentioned embodiments can also be applied to an application such as biometric authentication. Further, even if each of the above-mentioned embodiments is used for authentication and comparison method of a plurality of sites, information related to enrolled data and biometric information can be strongly concealed.

Each disclosure of the above-listed Patent Literature and Non-Patent Literature is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element in each claim, each element in each example, each element in each drawing, and the like) are possible within the scope of the claims of the present invention. That is, the present invention naturally includes various variations and modifications that could be made by those skilled in the art according to the overall disclosure including the claims and the technical concept. With respect to a numerical value range described herein, an arbitrary numerical value and a small range included in the numerical value range should be construed to be specifically described even unless otherwise explicitly described.

The invention claimed is:

1. A bit string collation system comprising:
a memory:
at least one processor configured to implement:
a first bit string position permutation unit that receives a first bit string as an input and performs position permutation of the first bit string;
a template generation unit that is communicatively connected with the first bit string position permutation unit to receive, from the first bit string permutation unit, a bit string resulting from the position permutation of the first bit string, the template generation unit configured to:
perform an exclusive OR operation of the received bit string resulting from the position permutation of the first bit string by the first bit string position permutation unit and a code word of a binary linear code,
generate auxiliary data for use in verifying that a Hamming distance between bit strings resulting from position permutation operations is not more than a predetermined value, and
store a result of the exclusive OR operation and the auxiliary data as a template in the memory;
a second bit string position permutation unit that receives a second bit string as an input and performs same position permutation of the second bit string as the position permutation by the first bit string position permutation unit;
a bit string inquiry unit that is communicatively connected with the second bit string position permutation unit to receive, from the second bit string permutation unit, a bit string resulting from the position permutation of the second bit string; and
a bit string collation unit that is communicatively connected with the bit string inquiry unit and the memory, wherein the bit string collation unit is configured to:
receive the bit string resulting from the position permutation of the second bit string by the second bit string position permutation unit from the bit string inquiry unit;
receive the template stored in the memory;
verify that a Hamming distance between the bit string resulting from the position permutation of the second bit string by the second bit string position permutation unit and the bit string used for generation of the template and resulting from the position permutation of the first bit string by the first bit string position permutation unit is not more than the predetermined value, based on the bit string resulting from the position permutation of the second bit string by the second bit string position permutation unit and the result of the exclusive OR operation and the auxiliary data stored in the memory as the template;
determine that the first bit string and the second bit string match when the Hamming distance is verified to be not more than the predetermined value; and
output a collation result that indicates whether the first bit string matches the second bit string.

2. The bit string collation system according to claim 1, wherein each of the first and second bit string position permutation units uses the position permutation including bit inversion.

3. The bit string collation system according to claim 1, wherein each of the first and second bit string position permutation units uses the position permutation that is different for each input bit string.

4. The bit string collation system according to claim 2, wherein each of the first and second bit string position permutation units uses the position permutation including bit inversion that is different for each input bit string.

5. The bit string collation system according to claim 1,
wherein the at least one processor comprises a first at least one processor, a second at least one processor, and a third at least one processor,
wherein the first at least one processor is configured to implement a bit string registration apparatus including:
the first bit string position permutation unit; and
the template generation unit;
wherein the second at least one processor is configured to implement a bit string inquiry apparatus including:
the second bits sequence position permutation unit; and
a bit string inquiry unit that receives the bit string that undergoes the position permutation by the second bit string position permutation unit, and then supplies and receives data to and from the bit string collation unit, for inquiry; and
wherein the third at least one processor is configured to implement a bit string collation apparatus including
the bit string collation unit that receives from the bit string inquiry unit the bit string having bit position thereof permutated by the second bit string position permutation unit and then performs collation with reference to the template.

6. A bit string collation method by a data processing apparatus including a memory, the method comprising:
performing position permutation of an input first bit string;
performing an exclusive OR operation of a bit string resulting from the position permutation of the first bit string and a code word of a binary linear code, generating auxiliary data for use in verifying that a Hamming distance between bit strings resulting from position permutation is not more than a predetermined value, and storing a result of the exclusive OR operation and the auxiliary data in the memory as a template;
performing same position permutation of an input second bit string as the position permutation applied to the first bit string;
verifying that a Hamming distance between the bit string resulting from the position permutation of the second bit string and the bit string used for generation of the template and resulting from the position permutation of the first bit string is not more than the predetermined value, upon receipt of the bit string resulting from the position permutation of the second bit string and the result of the exclusive OR operation and the auxiliary data stored in the memory as the template; and determining the first bit string and the second bit string match when the Hamming distance is verified to be not more than the predetermined value;

outputting a collation result that indicates whether the first bit string matches the second bit string.

7. The bit string collation method according to claim 6, wherein each of the position permutation operations of the first and second bit strings includes bit inversion.

8. The bit string collation method according to claim 6, wherein each of the position permutation operations of the first and second bit strings uses one of:
  position permutation of a bit string, the position permutation being different for each system;
  position permutation including bit inversion, the position permutation being different for each system;
  position permutation that is different for each input bit string; and
  position permutation including bit inversion, the position permutation being different for each bit string.

9. A non-transitory computer-readable recording medium storing therein a program to cause a computer to execute the processing comprising:
  performing position permutation of an input first bit string;
  performing an exclusive OR operation of a bit string resulting from the position permutation of the first bit string and a code word of a binary linear code, generating auxiliary data for use in verifying that a Hamming distance between bit strings resulting from position permutation operations is not more than a predetermined value, and storing a result of the exclusive OR operation and the auxiliary data in a memory as a template;
  performing same position permutation of an input second bit string as the position permutation applied to the first bit string;
  verifying that a Hamming distance between a bit string resulting from the position permutation of the second bit string and the bit string used for generation of the template and resulting from the position permutation of the first bit string is not more than the predetermined value, based on the bit string resulting from the position permutation of the second bit string and the result of the exclusive OR operation and the auxiliary data stored in the memory as the template;
  determining the first bit string and the second bit string match when the Hamming distance is verified to be not more than the predetermined value and
  outputting a collation result that indicates whether the first bit string matches the second bit string.

10. The recording medium according to claim 9, wherein each of the position permutation operations of the first and second bit string includes bit inversion.

11. The bit string collation system according to claim 1, wherein each of the first and second bit string position permutation units uses one of
  position permutation of a bit string, the position permutation being different for each system; and
  position permutation including bit inversion, the position permutation being different for each system.

12. The bit string collation system according to claim 1, wherein each of the first and second bit string position permutation units performs transformation such that an exclusive OR of bit strings (P1 (Z1) and P2 (Z2)) resulting from position permutations (P1 and P2) that are different for each system or each bit string, applied respectively to bit strings (Z1 and Z2), corresponds to a Hamming distance between the bit strings (Z1 and Z2).

13. The bit string collation system according to claim 1, wherein the template generation unit calculates a cryptographic hash function (h) using an encrypted data (W1) obtained by the exclusive OR of the bit string (Z) having bit position permutated by first bit string position permutation unit and the code word (C),
  generates the auxiliary data (W2) based on the hash value,
  applies linear encoding to the hash value (h) concatenated with a random number (r) to obtain a second code word (C3),
  performs an exclusive OR of the second code word (C3) and the bit string (Z) having bit position permutated by first bit string position permutation unit to generate another one of the auxiliary data (W3), and
  stores W1, W2 and W3 in the memory as the template.

14. The bit string collation system according to claim 13, wherein each of the template is allotted to an identifier.

15. The bit string collation system according to claim 5, wherein the bit string inquiry apparatus and the bit string collation apparatus perform Diffie-Hellman key exchange to share a shared secret key therebetween.

16. The recording medium according to claim 9, wherein each of the position permutation operations of the first and second bit strings uses one of:
  position permutation of a bit string, the position permutation being different for each system;
  position permutation including bit inversion, the position permutation being different for each system;
  position permutation that is different for each input bit string; and
  position permutation including bit inversion, the position permutation being different for each bit string.

* * * * *